July 12, 1932.  J. F. LEAHY  1,867,161
GEAR CUTTER
Filed July 5, 1928  2 Sheets-Sheet 1

Inventor
James F. Leahy
By Rockwell & Bartholow
Attorneys

July 12, 1932.  J. F. LEAHY  1,867,161
GEAR CUTTER
Filed July 5, 1928  2 Sheets-Sheet 2

Inventor
James F. Leahy
By *Maxwell & Bartholow*
Attorneys

Patented July 12, 1932

1,867,161

UNITED STATES PATENT OFFICE

JAMES F. LEAHY, OF BUFFALO, NEW YORK, ASSIGNOR TO FARREL-BIRMINGHAM COMPANY, INC., OF BUFFALO, NEW YORK

GEAR CUTTER

Application filed July 5, 1928. Serial No. 290,375.

This invention relates to improvements in apparatus for making gears and particularly in forming or cutting the teeth of gears. More especially this invention relates to an improved cutter for the use in gear cutting apparatus, such as machines of the type shown in Patent No. 1,750,030, issued to William E. Sykes, March 11, 1930, and Patent No. 1,814,348, issued to William E. Sykes, July 14, 1931.

In the cutting of gears by this type of machine, a pair of cutters are alternately advanced across the face of the gear blank and at the same time are given a rotary feeding movement, which comprises rolling both the blank and the cutter upon each other so as to generate the form of tooth required. In cutting either single or double helical gears, the cutters are given an additional movement relatively to the blank, comprising a twisting or helical motion during their travel across the blank, so as to cut teeth of the required obliquity in the blank face. A cutter suitable for use in cutting helical gears by machines of this type, is shown and described in Patent No. 1,668,345, issued to William E. Sykes and dated May 1, 1928.

The cutters generally used in this type of machine are of the so-called pinion type, being formed in the shape of a gear. The width of the face of these cutters is of relatively small dimension and the teeth upon their peripheries are accurately formed so as to cut the correct form of tooth in the gear blank, and are of the correct pitch to properly mesh with the teeth of the gear being cut. In view of the necessity of extreme accuracy, such cutters are very expensive to make, and should one of them become broken the expenditure of a relatively large amount of labor and money is required to reproduce it. It has, therefore, been found to be advisable to rough out the grooves in the gear blank before such an expensive cutter is used, so as to relieve the same of a large portion of the work required in removing the metal between the teeth of the gear to be cut. This procedure has been found to be especially advisable when cutting gears of relatively large pitch, such as 1 D. P. or more.

The principal object of this invention is to provide an inexpensive and efficient cutter for use when making a roughing cut upon a gear blank in machines of the above type.

Another object of this invention is to provide a cutter for use in cutting grooves in a gear blank or the like, the cost of which and the upkeep thereof will be relatively low, and by the use of which the time lost, due to cutter breakage while making gears, will be eliminated and the production cost of such gears will be reduced to a minimum.

Another object of this invention is to provide an improved gear cutter for use in the above mentioned or a similar type of machine.

Another object of this invention is to provide a gear cutter of the pinion type, having teeth upon its periphery, a portion of each of the teeth being adapted to cut a groove in the gear blank and to be radially removable from the remaining tooth portion when such removal is desired.

Still another object of this invenion is to provide a gear cutter of pinion type, comprising a toothed body portion, having a radially removable cutting portion inserted in each tooth.

A further object of this invention is to provide an improved gear cutter of the pinion type, comprising a toothed body portion and a radially removable cutting portion, and wherein the cutting portion is adjustable radially to provide for wear upon the periphery of said cutter.

A still further object of this invention provides an improved gear cutter of the pinion type, comprising a toothed body portion with a plurality of removable cutting portions, which are adapted to be adjusted radially relatively to the body portion by means readily accessible from the periphery of the body portion.

To these and other ends, the invention consists in the novel features and combinations of parts to be hereinafter described and claimed.

Figure 1:
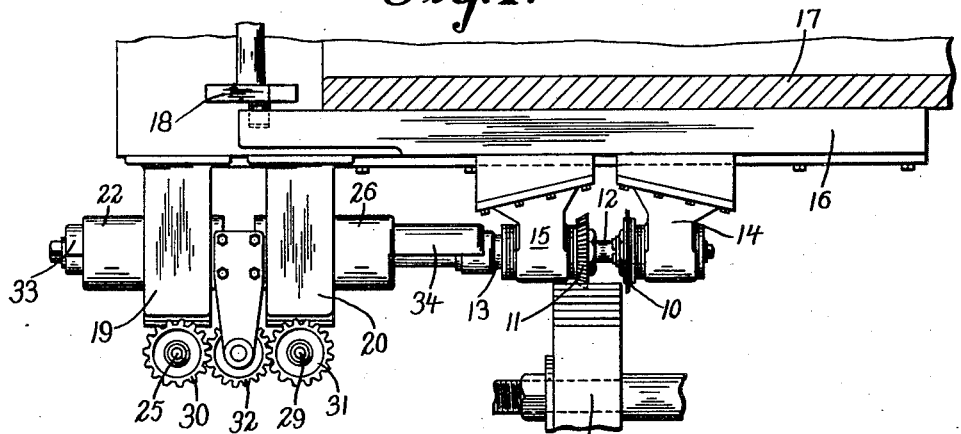
Fig. 1 is a view of a gear cutting machine showing somewhat diagrammatically the principal operating mechanism for the cutters, with the machine set up for forming a straight toothed or spur gear.
Figure 4:
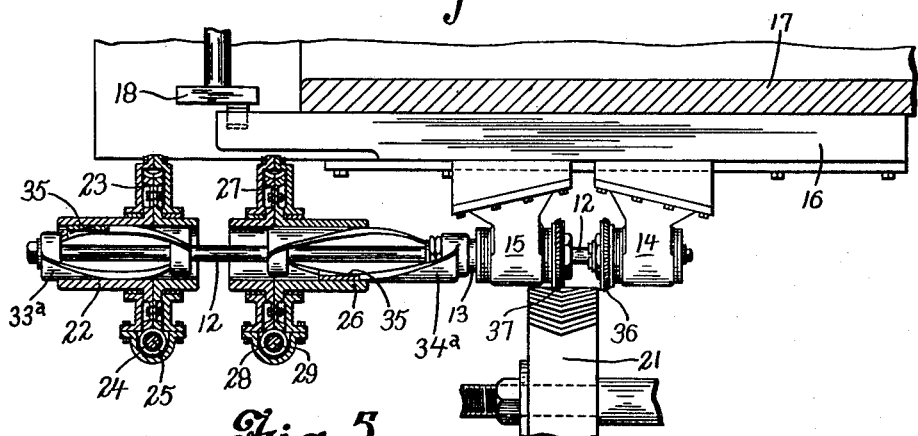
Fig. 4 is a view of the machine shown in Fig. 1, as arranged for forming a double helical gear.

Figs. 1 and 4 illustrate by way of example a mechanism by which the necessary movements of a cutter of the pinion type can be obtained. In the arrangement illustrated in Fig. 1, two cutters for cutting spur gears are employed. The cutter 10, which is a roughing cutter and embodies the features of this invention, is secured to a spindle 12, and the cutter 11, which is a finishing cutter, is secured to a hollow spindle 13. The spindle 12 passes through the spindle 13 and is free to rotate and slide relatively thereto. The spindles 12 and 13 are secured to supports 14 and 15 respectively, which in turn are secured to a carriage 16, which is slidably mounted on a frame 17. The carriage 16 may be reciprocated by means of a crank mechanism, which in this instance, is diagrammatically illustrated at 18.

The spindles 12 and 13 extend into gear casings 19 and 20 respectively, wherein suitable gear drives and connections thereto are provided, whereby each of the spindles may be continuously rotated while being reciprocated, so as to cooperate with a similar continuous rotation of a gear blank 21, to cause the form of the teeth being cut to be correctly generated. By reference to Fig. 4 it may be observed that the spindle 12 is secured within a sleeve 22, which is a part of a worm wheel 23. The worm wheel 23 is in mesh with a worm 24, which is driven by a vertical shaft 25. The shaft 25 may be suitably geared or otherwise connected to the power source of the machine. It will also be observed that the spindle 13 is secured to a sleeve 26, which is part of a worm wheel 27. The worm wheel 27 is in mesh with a worm 28, mounted on and driven by a shaft 29. Referring to Fig. 1, it will be observed that the vertical shafts 25 and 29 are provided at their upper ends with gear pinions 30 and 31, respectively. The gear pinions 30 and 31 are connected by an idler 32, whereby the movement of both cutters is controlled and a continuously rotatable feed in the same direction and at the same speed is insured.

The spindles 12 and 13 are guided by suitable guide members, while being reciprocated. These guide members are provided with guiding surfaces which ride on suitable guiding nuts. The guiding surfaces of the guide members 33 and 34, used in the spur gear cutting arrangement shown in Fig. 1, are parallel to the longitudinal axes of the spindles 12 and 13, whereby the cutters are guided in a straight path during their reciprocating movements. The guiding surfaces of the guide members 33ª and 34ª, used in the helical gear cutting arrangement shown in Fig. 4, are in the form of a helix and at an angle to the longitudinal axes of the spindles 12 and 13, whereby the cutters will be twisted or given a helical movement by cooperating with the guide nuts 35, while being reciprocated. The amount of such twisting is made proportional to the angle of the helical tooth to be cut.

The cutters 10 and 11, for cutting spur gears, reciprocate entirely across the face of the gear blank. The roughing cutter 10 is somewhat larger in diameter than the finishing cutter 11, when measured across diametrically opposite teeth. The diameter of the roughing cutter may be varied by adjusting the bits 48 as hereinafter described. The roughing cutter 10 is reciprocated first across the blank, due to the movement of the carriage 16, and cuts a groove entirely across the blank. Upon reverse movement of the carriage, the finishing cutter 11 passes across the blank. After the roughing cutter has been fed into the blank a sufficient amount by mechanism (not shown) but which is provided to cause a relative movement between the cutters and the blank toward each other, the finishing cutter will start cutting. These movements continue until all of the teeth are formed in the gear blank. The finishing cutter 11 is of the usual shape, the teeth being formed correctly for completing the teeth in the gear blank.

When cutting herringbone or double helical gears, as in Fig. 4, the stroke of the carriage 16 is adjusted so that each of the cutters 36 and 37 will not completely cross the face of the blank, but will terminate at the center thereof or at the apices of the helical teeth being cut. In this instance, therefore, no finishing cutter is used until after the teeth of the gear blank have been roughed out. After this operation is completed, finishing cutters are substituted for the roughing cutters 36 and 37, upon the respective spindles 12 and 13.

Figure 2:
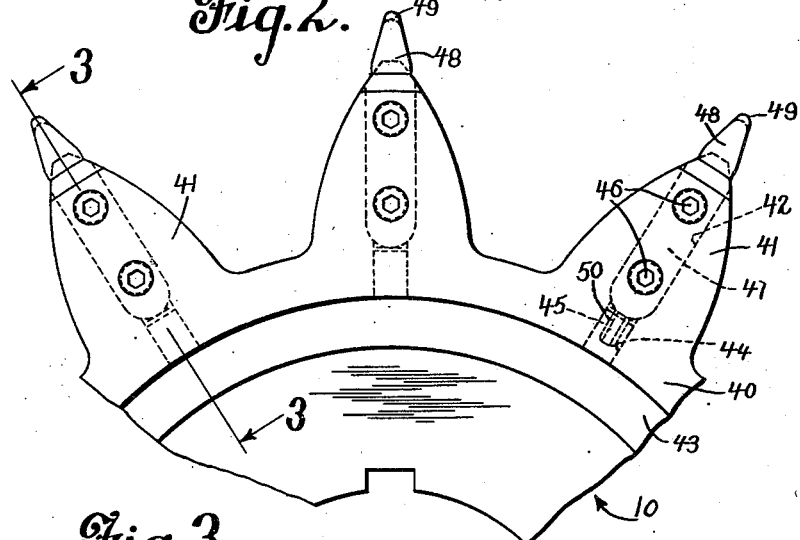
Fig. 2 is a partial front end view of a cutter embodying the features of this invention, adapted for use in cutting spur gears.
Figure 3:
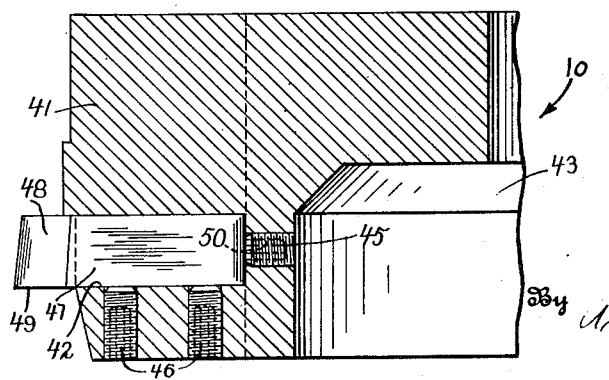
Fig. 3 is a section on line 3—3 of Fig. 2.

The roughing cutter 10 (see Figs 2 and 3) comprises a disk-like body portion 40, which is provided with peripheral teeth 41, integrally formed therewith. Part 40, with the teeth 41, is in the form of a gear pinion, preferably of cast steel. Each tooth 41 is provided with a radially directed opening or socket 42, which is preferably rectangular in cross section. The opening 42 extends to the outer edge of the tooth, and at its inner end terminates short of the periphery of a recess 43, formed in an end face of the part 40. Communicating with the opening 42, and recess 43, is a threaded opening 44 into which an adjusting screw 45 is adapted to be screwed. Clamp screws 46 are screwed into openings suitably provided therefor in the end of each tooth 41, and are adapted to engage and clamp the shank 47 of a cutting bit 48, inserted in each opening 42.

The cutting bits 48 are suitably formed, by grinding, to provide a cutting edge 49 at the outer end thereof, which projects radially from the periphery of each tooth 41. The adjusting screws 45 are provided with tool engageable means 50, in this instance comprising a wrench socket, on the outer ends thereof, which end is adjacent the opening 42 and the inwardly directed end of shank 47. When the bit 48 is removed by loosening the clamp screws 46, and withdrawing the bit from the opening 42, the tool engageable means 50 of the adjusting screw 45 is readily accessible from the periphery of the cutter 10 or teeth 41. The raising or lowering of the adjusting screw 45 will vary the amount that the bit 48 may enter the socket 42, and therefore will vary the amount that the cutting edge 49 projects from the periphery of the cutter, thus controlling the diameter of the cutter. In case of the breakage of one of the bits 48 or the necessity for grinding the cutting edge 49 thereof to sharpen it, it may be readily removed without disturbing the setting of the cutter on its spindle or any of the remaining bits therein. An adjustment of the screw 45 permits the replacement of the removed bit into its respective opening 42, with its cutting edge 49 disposed outwardly in peripheral alignment with the cutting edges 49 of the remaining bits 48.

Figure 5:
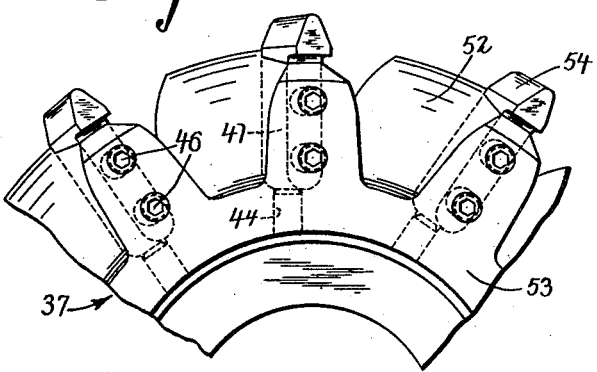
Fig. 5 is a partial front end view of a cutter embodying the features of this invention, adapted for use in cutting double helical gears.
Figure 6:
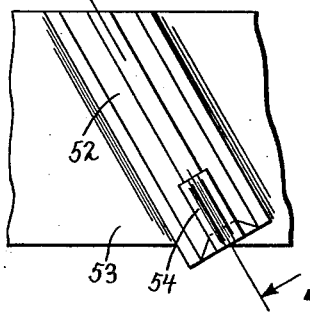
Fig. 6 is a top view of one of the cutters shown in Fig. 5.
Figure 7:
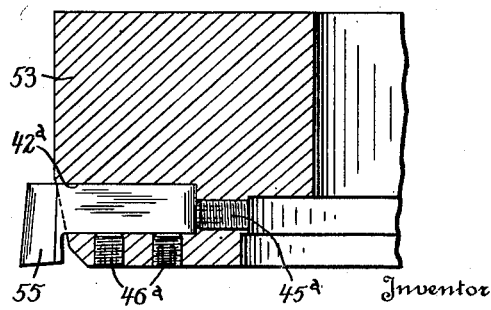
Fig. 7 is a section on line 7—7 of Fig. 6.

In the form of roughing cutter shown in Figs. 5, 6 and 7, teeth 52 are formed integrally with a body part 53. The teeth 52, in this instance, are formed at an angle to the longitudinal axis of the part 53, so that they will properly follow the path of the helical teeth to be cut. The cutting bits 54, in this instance, are disposed in the openings 42ª, and the adjusting screws 45ª and clamp screws 46ª adjust and clamp bits 54, as in the previously described form. The bits 54, however, are provided with overhanging or offset cutting edge portions 55, so as to permit the cutting of a groove in the blank up to the apex of the helical tooth to be cut therein, without the teeth 52 striking the gear blank at this point.

The gear cutters of this invention are inexpensive to manufacture in respect to both labor and material, the material of the body portion being relatively inexpensive and readily worked, and the cutting bits being of such form that a small amount of labor is required to form them. The upkeep cost of such a cutter is comparatively small, inasmuch as there is little likelihood of the body part ever wearing out in use or of becoming seriously damaged, and as the cutting bits are readily resharpened or replaced.

The use of such cutters permits the cutting of gear teeth in blanks at relatively high speeds and feeds, whereby the cost of gear production is substantially decreased. The ease of cutter repair or replacement insures a more continuous operation of the machine. By being individually and radially removable, a cutting bit can be removed without disturbing the others or the setting of the cutter as a whole. By being individually adjustable the accuracy in cutter diameter required for this style of work is insured.

The provision of means whereby the cutting bits may be adjusted and which is accessible from the periphery of the cutter, greatly facilitates their adjustment and reduces the time required therefor.

While I have shown and described preferred embodiments of my invention, it is understood that it is not to be limited to all of the details shown, but is capable of modification and variation which will lie within the spirit of the invention and the scope of the appended claims.

What I claim is:

1. In a gear cutter, a disk-like body part having a series of circumferentially spaced apart projections of toothlike form on the periphery thereof, each of said projections having a cutting bit receiving opening therein open only at the outer peripheral surface thereof and confined within the front, back and side walls of each projection, and means passing through the front wall of each projection to engage and clamp a cutting bit disposed in the opening therein.

2. In a gear cutter, a disk-like body part having a series of circumferentially spaced apart projections of toothlike form on the periphery thereof, each of said projections having a cutting bit receiving opening therein open only at the outer peripheral surface thereof and confined within the front, back and side walls of each projection, means passing through the front wall of each projection to engage and clamp a cutting bit disposed in the opening therein, and adjustable means passing through the body part beneath each projection and adapted to engage a cutting bit inserted in the opening therein to limit the amount the cutting bit can be inserted therein.

3. In a gear cutter, a disk-like body part having a series of circumferentially spaced apart projections of toothlike form on the periphery thereof, each of said projections having a cutting bit receiving opening therein open only at the outer peripheral surface thereof and confined within the front, back and side walls of each projection, means passing through the front wall of each projection to engage and clamp a cutting bit disposed in the opening therein, and adjusting means passing through the body part beneath each projection and having an end thereof adapted to engage a cutting bit inserted in the opening therein to limit the amount the cutting bit can be inserted therein, said adjusting means being engageable for adjusting operation only at the end thereof adapted to engage the cutting bit, whereby accidental adjustment thereof is prevented after the cutting bit is clamped in place.

4. A gear cutter of the pinion type, comprising a disk-like body part having outwardly and radially extending projections that are equally spaced apart circumferentially upon its periphery, each of said projections having a radially directed opening therein extending completely through the material thereof, a cutting bit disposed in the opening in each of said projections and extending beyond the outer peripheral end of the projection, and means in the opening in each projection and radially movable to limit and adjust the amount said bit extends therefrom.

5. A gear cutter of the pinion type, comprising a disk-like body part having outwardly and radially extending projections that are equally spaced apart circumferentially upon its periphery, each of said projections having a radially directed opening therein extending completely through the material thereof, and a cutting bit disposed in the opening in each of said projections and extending beyond the outer peripheral end of the projection, means passing axially with respect to said disk-like body part through each of said projections and engaging said shank portion to retain said bit within the opening in said projection, and means in the opening in each of said projections below the shank portion of each cutting bit and in engagement with the inner end thereof and movable radially with respect to the disk-like body to limit the amount said bit is inserted into the opening of each projection.

6. A gear cutter of the pinion type, comprising a disk-like body part having outwardly and radially extending projections that are equally spaced apart circumferentially upon its periphery, each of said projections having a radially directed opening therein extending completely through the material thereof, and a cutting bit disposed in the opening in each of said projections and extending beyond the outer peripheral end of the projection, means passing axially with respect to said disk-like body part through each of said projections and engaging said shank portion to retain said bit within the opening in said projection, and means threaded in the opening in said projection below and in engagement with the inner end of the shank portion of each cutting bit and when rotated being movable radially with respect to the disk-like body to limit the amount said bit is inserted into the opening of each projection, said last-named means being engageable for rotative movement only at the end thereof engaging said bit.

7. A gear cutter of the pinion type, comprising a disk-like body part having outwardly and radially extending projections of gear tooth form that are equally spaced apart circumferentially upon its periphery, each projection extending axially across the peripheral face of said disk-like body part, each of said projections having a radially directed opening therein adjacent one end face of said disk-like body part and extending radially through the material thereof, and a cutting bit having a cutting edge upon one of its ends and a shank portion upon the other end, said cutting bit being disposed with its shank portion within the opening in each of said projections and with its cutting edge extending beyond the outer peripheral end of the projection, means passing axially with respect to said disk-like body part through the end face thereof and engaging said shank portion of each of said bits to retain the same within the opening in said projection, and means in the opening in each of said projections below and in engagement with the inner end of the shank portion of each cutting bit and movable radially with respect to the disk-like body to limit the amount said bit is inserted in the opening of each projection, said last-named means being engageable for movement only at the end thereof engaging said shank portion.

In witness whereof, I have hereunto set my hand this 30 day of June, 1928.

JAMES F. LEAHY.